United States Patent
Dumas et al.

(10) Patent No.: US 10,284,031 B2
(45) Date of Patent: May 7, 2019

(54) STATOR, AND ELECTRICAL MACHINE COMPRISING SUCH A STATOR

(71) Applicant: LOHR ELECTROMECANIQUE, Hangenbieten (FR)

(72) Inventors: Pierre Dumas, Strasbourg (FR); Laurent Verdier, Eschau (FR)

(73) Assignee: LOHR ELECTROMECANIQUE, Hangenbieten (FR)

( * ) Notice: Subject to any disclaimer, the term of this patent is extended or adjusted under 35 U.S.C. 154(b) by 276 days.

(21) Appl. No.: 15/329,415

(22) PCT Filed: Jul. 24, 2015

(86) PCT No.: PCT/FR2015/052056
§ 371 (c)(1),
(2) Date: Jan. 26, 2017

(87) PCT Pub. No.: WO2016/016558
PCT Pub. Date: Feb. 4, 2016

(65) Prior Publication Data
US 2017/0214280 A1 Jul. 27, 2017

(30) Foreign Application Priority Data
Jul. 28, 2014 (FR) ..................... 14 57304

(51) Int. Cl.
*H02K 1/14* (2006.01)
*H02K 1/18* (2006.01)
(Continued)

(52) U.S. Cl.
CPC ............. *H02K 1/187* (2013.01); *H02K 1/148* (2013.01); *H02K 1/2786* (2013.01); *H02K 7/14* (2013.01); *H02K 9/005* (2013.01)

(58) Field of Classification Search
CPC ........ H02K 1/148; H02K 1/185; H02K 1/187; H02K 3/522; H02K 2203/13; H02K 2203/12
See application file for complete search history.

(56) References Cited

U.S. PATENT DOCUMENTS

| | | | | |
|---|---|---|---|---|
| 2,236,291 A | * | 3/1941 | Kilbourne | ............ H02K 1/148 310/216.061 |
| 3,147,393 A | * | 9/1964 | Iwai | ...................... H02K 1/185 310/216.079 |

(Continued)

FOREIGN PATENT DOCUMENTS

EP 2367264 9/2011

OTHER PUBLICATIONS

International Search Report issued in International Application No. PCT/FR2015/052056, dated Apr. 21, 2016.

*Primary Examiner* — Dang D Le
(74) *Attorney, Agent, or Firm* — Meunier Carlin & Curfman LLC

(57) ABSTRACT

The invention relates to a stator tooth (8) for an electrical machine, the stator tooth being intended for holding an electrical wire winding (10). The tooth includes a central portion (24) formed with a contiguous assembly of precut magnetic metal sheets (24*a*). The metal sheets are secured to one another. The tooth is characterized in that the central portion (24) is enclosed between two longitudinal end portions (25) which are secured to the central portion (24) and each have a radial attachment bolt (11) passing therethrough. The longitudinal end portions (25) have a rounded outer shape (25*a*) for forming, on the ends of the tooth, a continuous contact surface for the electrical wire(s) wound onto the tooth.

14 Claims, 7 Drawing Sheets

Figure 1:
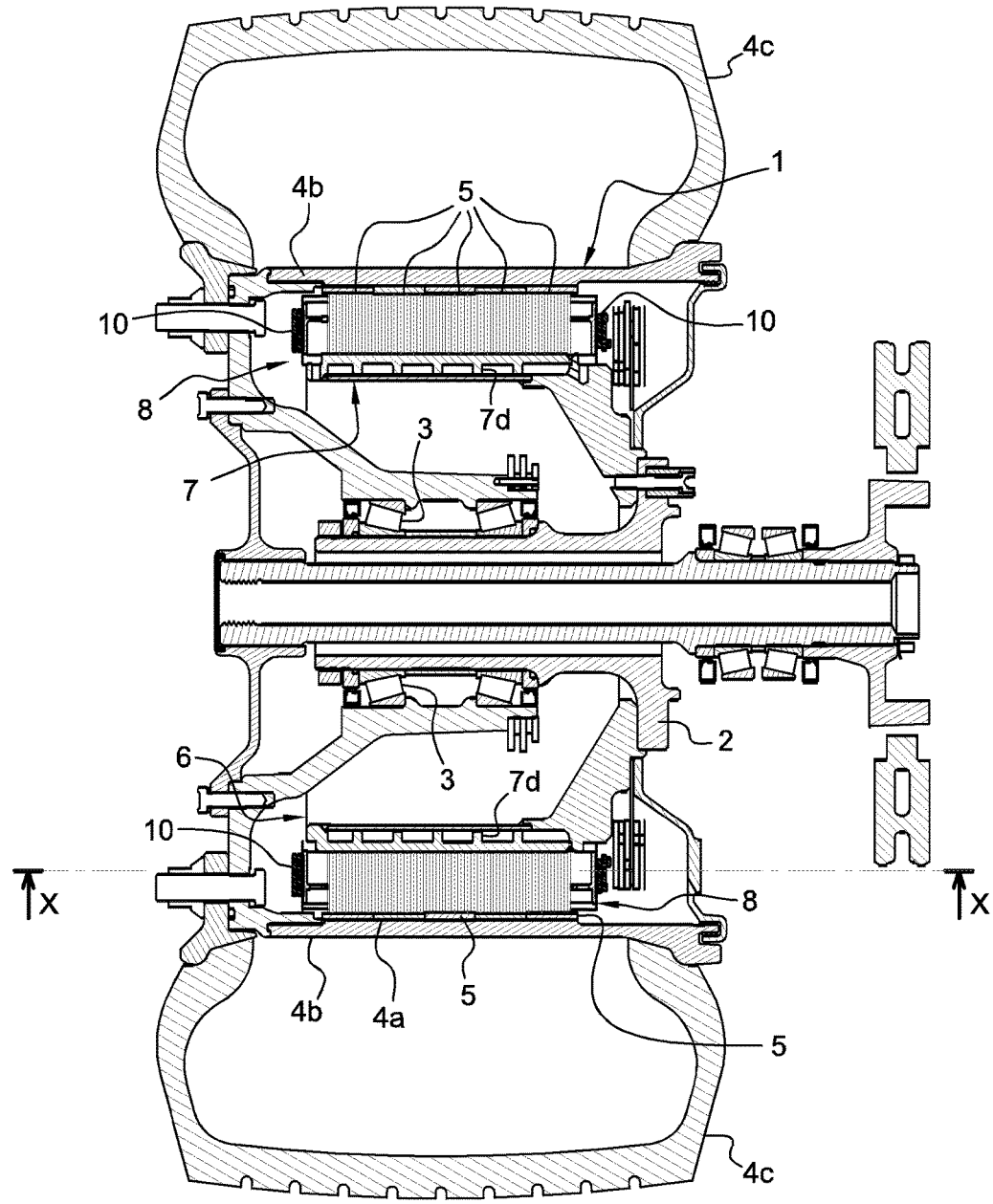

(51) Int. Cl.
  *H02K 1/27* (2006.01)
  *H02K 7/14* (2006.01)
  *H02K 9/00* (2006.01)

(56) References Cited

U.S. PATENT DOCUMENTS

| | | | | |
|---|---|---|---|---|
| 5,918,360 | A * | 7/1999 | Forbes | D06F 37/304 |
| | | | | 29/596 |
| 8,242,656 | B1 * | 8/2012 | Lin | H02K 3/522 |
| | | | | 310/194 |
| 8,963,395 | B2 * | 2/2015 | Ishino | H02K 3/522 |
| | | | | 29/596 |
| 2013/0294899 | A1 | 11/2013 | Jones et al. | |
| 2015/0270756 | A1 * | 9/2015 | Foulsham | H02K 3/30 |
| | | | | 310/43 |

* cited by examiner

FIG. 4
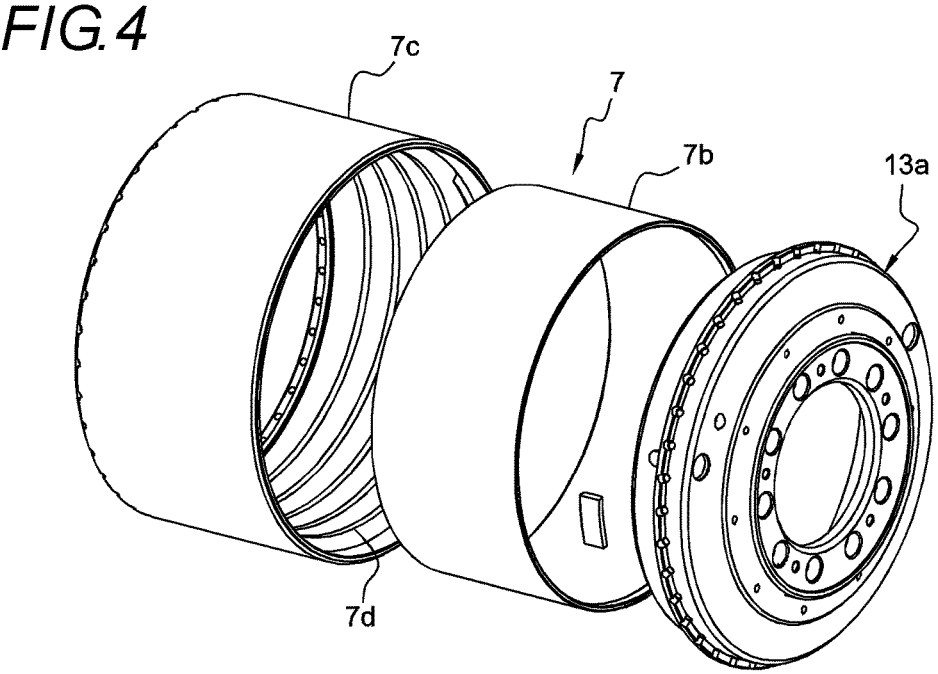
FIG. 9
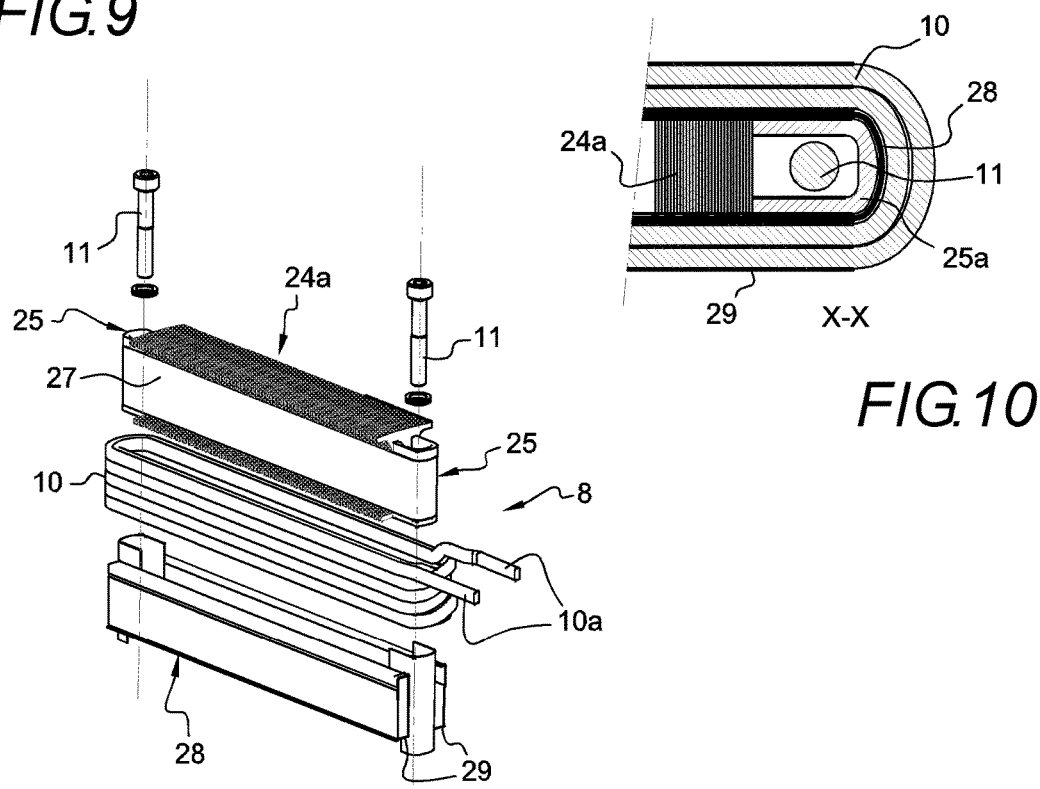
FIG. 10

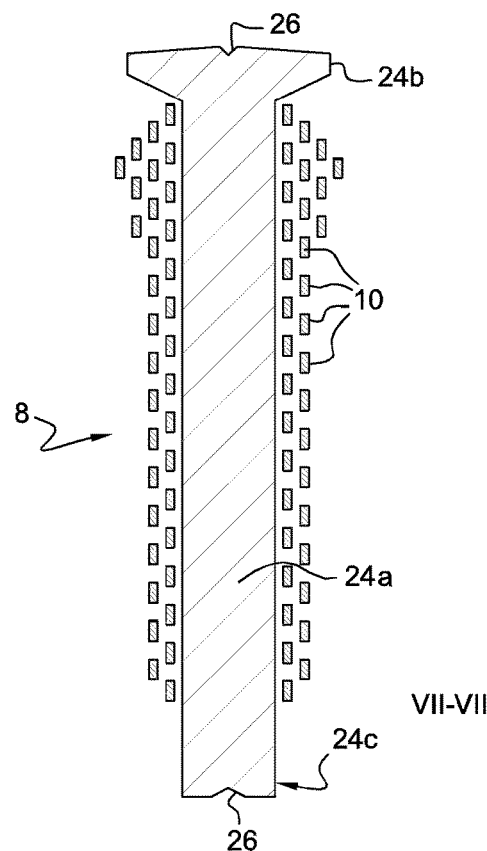
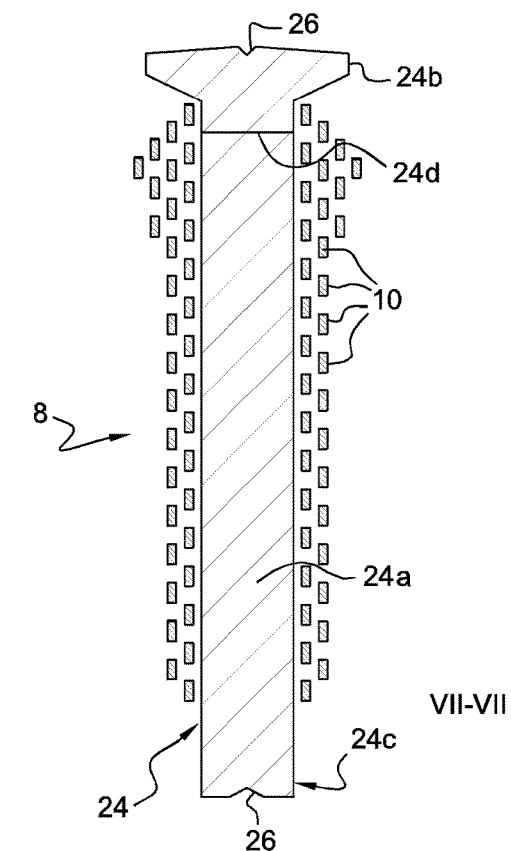
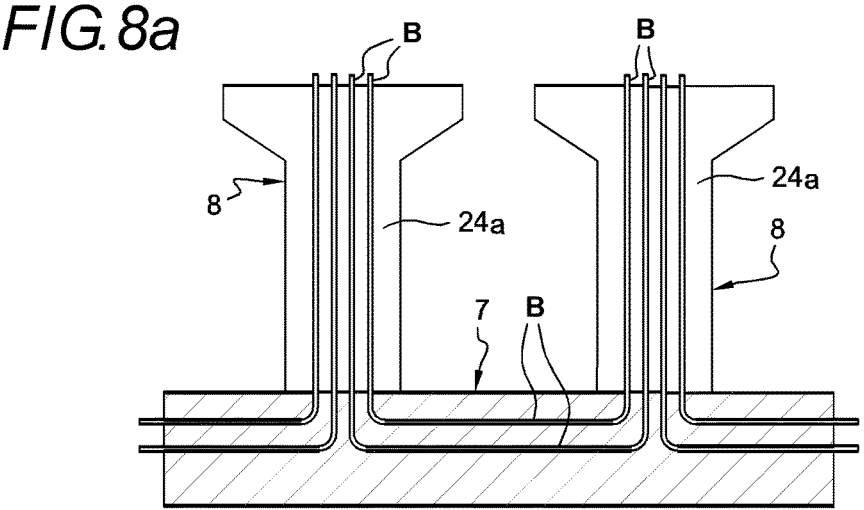

STATOR, AND ELECTRICAL MACHINE COMPRISING SUCH A STATOR

CROSS REFERENCE TO RLATED APPLICATION

This application is a national stage application of International PCT Application No. PCT/FR2015/052056, filed Jul. 24, 2015, which claims priority to, and the benefit of, French Patent Application No. 1457304, filed Jul. 28, 2014, each of which is incorporated by reference herein in its entirety.

TECHNICAL FIELD

The present invention relates to the general technical field of electric motors and more generally to synchronous machines comprising means for generating a magnetic induction.

More particularly, the present invention relates to an electrical machine, for example a synchronous machine with sinusoidal electromotive force or other, supplied by a multi-phase alternating voltage.

The invention will be described hereinafter more specifically but in a non-limiting manner with means for generating a magnetic induction constituted by way of an exemplary embodiment, of permanent magnets. The electrical machine is, for example, a wheel-motor.

A permanent magnet electrical machine is generally composed of a wound stator and a rotor carrying permanent magnets and extending around said stator. Such an electrical machine is powered and controlled by means of power electronics.

A permanent magnet electrical machine with sinusoidal electromotive force, can be controlled with a vector control system. This type of control, known as such, allows high performance to be obtained namely, high accuracy and high torque dynamics. This performance is needed, particularly for traction motors.

Also known are electrical machines wherein the stator, including the stator teeth, is manufactured with a contiguous assembly of metal sheets. Such a stator, once assembled, requires precise positioning in order to implement the winding of each tooth. These winding operations are difficult to implement and take a long time. In addition, the replacement of a defective tooth winding faces the same difficulties.

Furthermore, in other known synchronous machines, the stator teeth mounted radially on a stator yoke, have at their end in contact with the stator yoke, a relatively thick base in order to channel the magnetic field lines. These bases must all be in contact in order to avoid the passage of magnetic field lines through the air. However, the dimensional tolerances observed on the stator teeth render such contact between the bases very random. This problem is all the more important when the number of stator teeth mounted on the stator yoke is high. This may attenuate the magnetic field lines and therefore the performance of these synchronous machines.

DISCLOSURE OF THE INVENTION

The object of the present invention is therefore to overcome the drawbacks mentioned above and to provide stator teeth such as to improve the performance of the electrical machine wherein they are integrated.

A further object of the present invention is to provide a stator tooth that greatly simplifies the manufacture and assembly of a stator.

A further object of the present invention is to overcome the drawbacks mentioned above and to provide an optimized stator such as to enhance the performance of the electrical machine wherein it is integrated.

A further object of the present invention is to overcome the drawbacks mentioned above and to propose an electrical machine, constituting for example a wheel-motor, which is optimized dimensionally and in terms of its performance.

The objects of the invention are achieved by means of a removable stator tooth for an electrical machine and intended to hold a winding of an electrical wire, said stator tooth comprising a central portion formed with a contiguous assembly of precut magnetic metal sheets, said precut magnetic metal sheets being secured to one another, characterized in that said central portion is enclosed between two longitudinal end portions which are secured to the central portion and each have a radial attachment bolt passing therethrough, said longitudinal end portions having a rounded outer shape for forming, on the ends of the stator tooth, a continuous contact surface for the electrical wire(s) wound onto said stator tooth.

According to an exemplary embodiment of the stator tooth according to the invention, the electrical wire(s) have a rectangular cross section.

According to an embodiment of the stator tooth according to the invention, the longitudinal end portions are metallic.

The objectives of the invention are also achieved by means of a stator for an electric machine comprising a cylindrical stator yoke made from magnetic material, whereupon stator teeth, as presented above, are radially and directly attached.

According to an embodiment of the stator according to the invention, the stator yoke includes a cooling circuit.

For example, the stator yoke includes a central portion forming a radiator, a cooling fluid inlet and outlet manifold mounted in an axial direction on one end of the central portion and a cooling fluid return manifold mounted in an axial direction on the other end of the central portion, the inlet and outlet manifold being connected to the cooling circuit.

According to a further embodiment of the stator according to the invention, the stator yoke includes an inner cylindrical portion and an outer cylindrical portion extending around said inner cylindrical portion defining between said cylindrical portions a helical cooling system in the form of a double-pass helix constituting a radiator, the stator yoke further comprising a cooling fluid inlet and outlet manifold mounted in an axial direction on one end of the cylindrical portions and in fluid communication with the double pass helix, the inlet and outlet manifold being connected to the cooling circuit thus providing for the inlet and outlet of cooling fluid.

According to an embodiment of the stator according to the invention, the electrical wires wound onto the stator teeth have connection ends extending in the axial direction of said stator and that are connected according to a given phase connection scheme, by means of a connecting disk axially mounted on said connection ends.

According to a further embodiment according to the invention, the electrical wires wound onto the stator teeth comprise connection ends extending in the axial direction of said stator that are bent and/or folded-back in order to be interconnected by means of brazing, according to a given phase connection scheme.

According to a further embodiment of the invention, the electrical wires wound onto the stator teeth have connection ends extending in the axial direction of said stator that are connected according to a given phase connection scheme, by means of a brought piece brazed to the connection ends. Such a brought piece is constituted for example by an individual wire element, intended to connect two longitudinal ends.

The objectives of the invention are also achieved by means of an electrical machine comprising a rotor extending around a stator as set forth above.

According to an embodiment of the electrical machine according to the invention, the rotor is constituted of a magnetic metal sheet whereupon permanent magnets are directly attached.

For example, the permanent magnets are attached to the magnetic metal sheet by means of bonding or by any other mechanical retaining means.

The objectives of the invention are also achieved by means of a wheel-motor characterized in that it comprises an electrical machine as set forth above, the rotor having a hub mounted free in rotation by means of bearings on a fixed spindle, said rotor constituting a rim having an outer face upon which a tire is mounted and an inner face upon which the permanent magnets are attached, the stator being intended to be secured to a fixed frame.

The electrical machine according to the invention advantageously constitutes a wheel-motor of a rail or road vehicle.

The removable stator tooth according to the invention has the advantage of reducing the bulk thereof through the use of wound electrical wires having a rectangular cross section. The filling factor of the space occupied by the electrical wires thus rises to 50%, whereas it is about 40% for windings with electrical wires with a circular cross section.

The electrical wire is wound onto the stator tooth according to the invention, prior to the mounting thereof onto a stator yoke, thus greatly facilitating the winding and assembly operations.

Insofar as each stator tooth is removable, maintenance operations are thus facilitated. The stator teeth can thus be replaced individually. Electrical machines often include means of detection that allow for the identification of a stator tooth bearing a defective winding. The replacement of a stator tooth can be undertaken in such a way as to best reduce the maintenance costs and the out-of-service time of the electrical machine.

The stator tooth according to the invention also has the advantage, due to the rounded end portions, of increasing the contact surface with the wound electrical wire and consequently improving the heat dissipation thereof. The use of a metal, for example copper, for manufacturing the longitudinal end portions also contributes to better heat dissipation especially at the longitudinal ends of the stator teeth where the coils of electrical wire are located. This favorably influences the performance and lifespan of an electrical machine.

The stator according to the invention, comprising a stator yoke made of a magnetic material, has the advantage of directly closing the magnetic field lines created by the windings. The stator teeth can thus be mounted directly, that is to say without an intermediate magnetic insert, onto a stator yoke. Insofar as the magnetic field lines are closed due to the stator yoke, it is no longer necessary to manufacture stator teeth comprising massive and contiguous bases. This also reduces the height in the radial direction of the stator teeth. These latter, shorter teeth, make it possible to reduce the length of the trajectories of the field lines and consequently to reduce the losses of the electrical machine.

The stator according to the invention therefore has the enormous advantage of dispensing with the contact between the bases of the stator teeth. Indeed, the stator teeth are bolted to the stator yoke in a radial direction thus ensuring excellent radial tightening and good contact with said yoke. The risk that the magnetic field lines must pass through a layer of air, thus giving rise to their attenuation, is therefore largely reduced or virtually zero. The radial clamping provides better contact with the stator yoke than the resulting random contact between two juxtaposed bases. This results in better performance.

In addition, the wheel-motor according to the invention has the advantage of generating a space saving insofar as the permanent magnets are directly attached to the rim and not to an intermediate piece that is secured to said rim. A larger diameter is thus obtained upon which the permanent magnets are positioned. The number of permanent magnets can then be greater, thus improving the performance of the wheel-motor.

Figure 2:
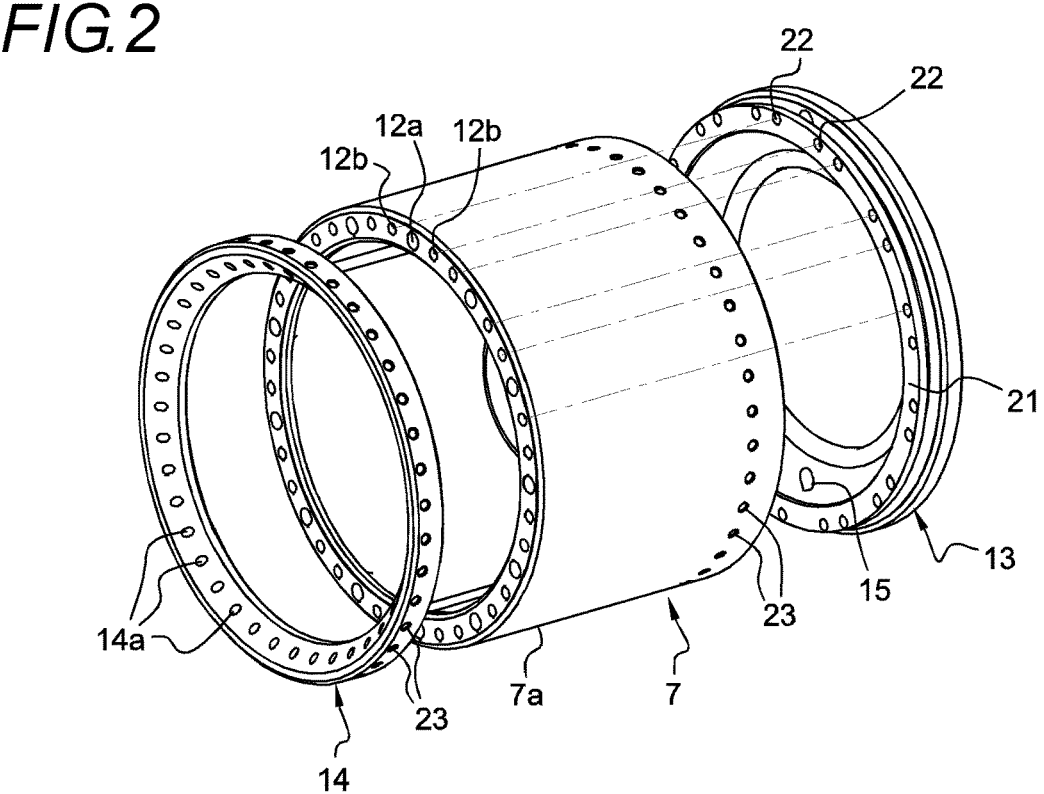
Figure 3:
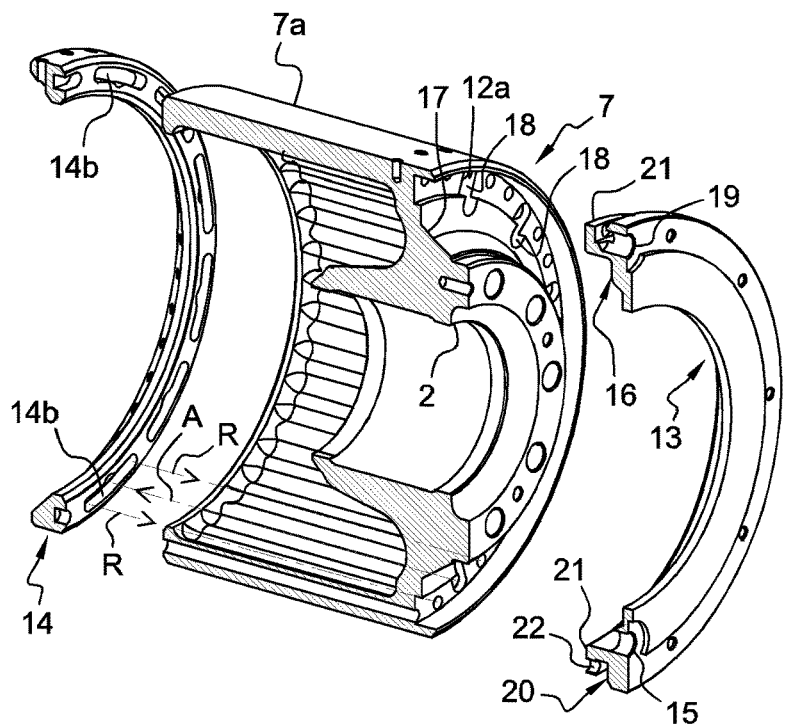
Figure 5:
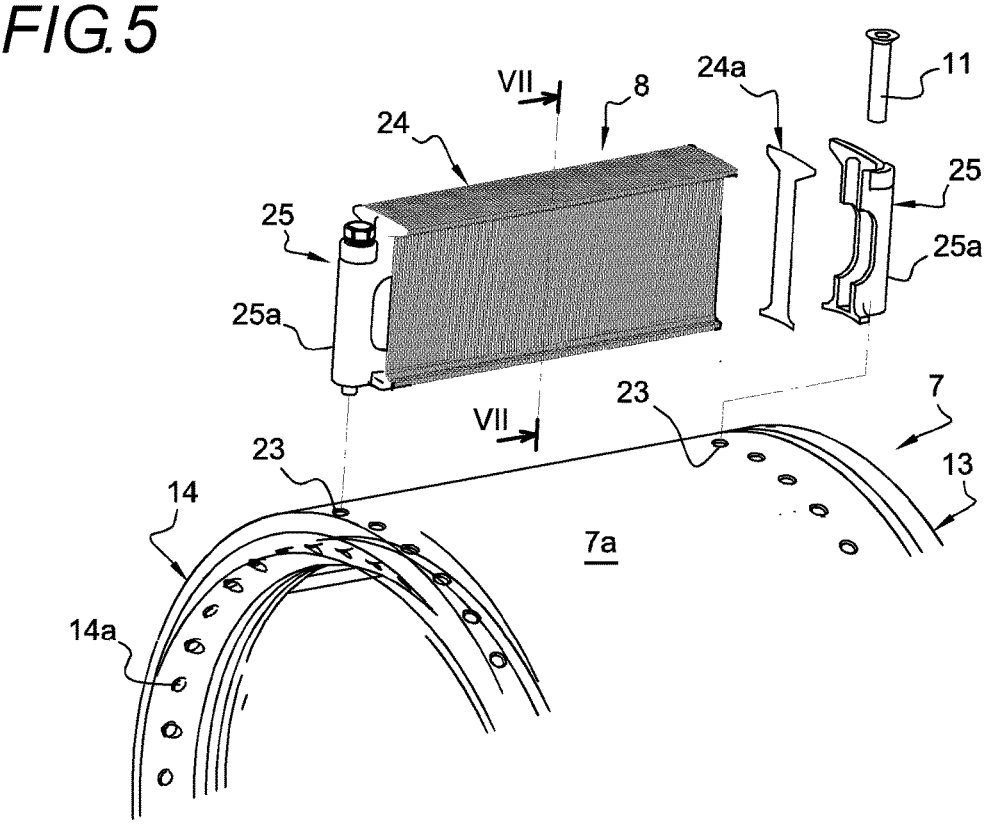
Figure 6:
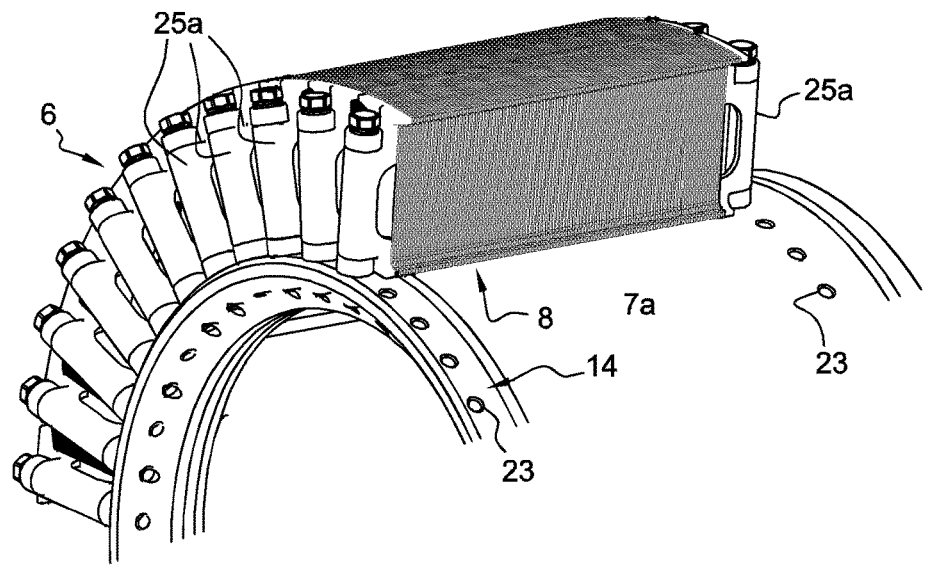
Figure 7:
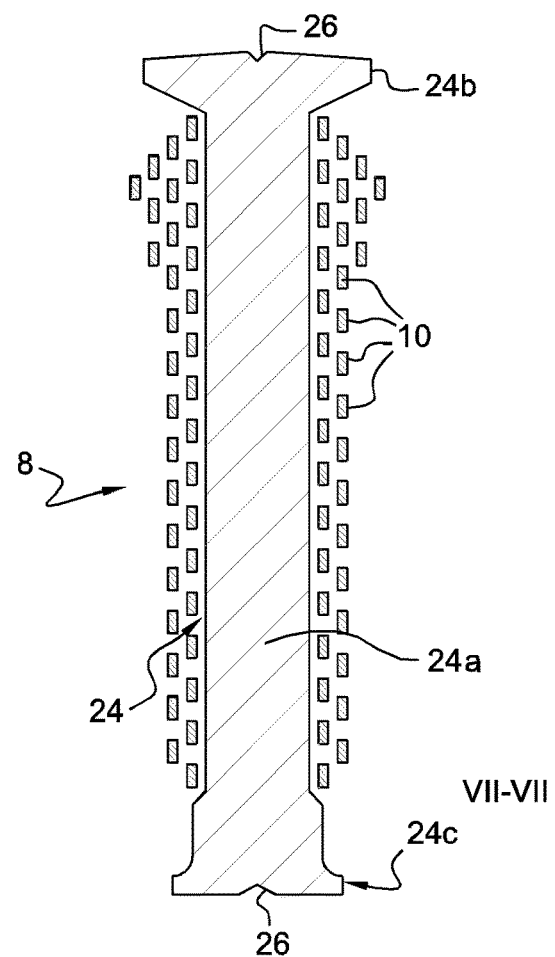
Figure 8:
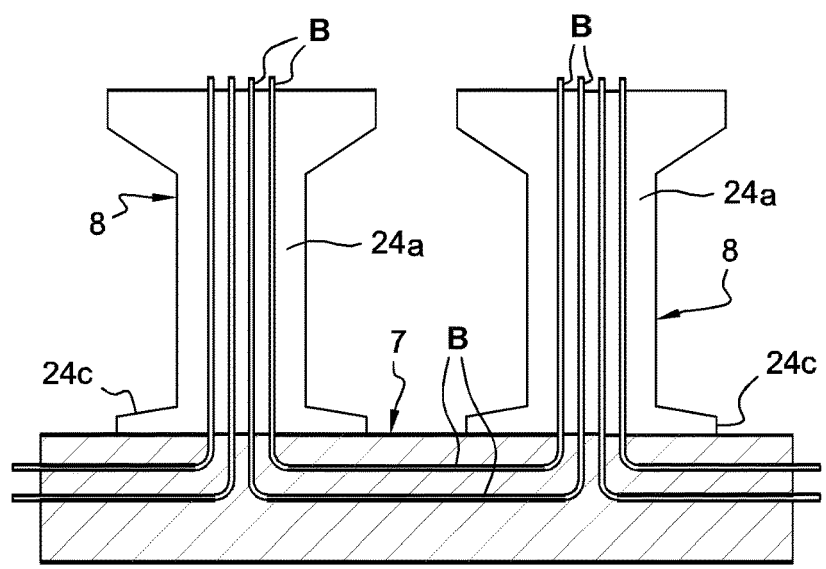
Figure 11:
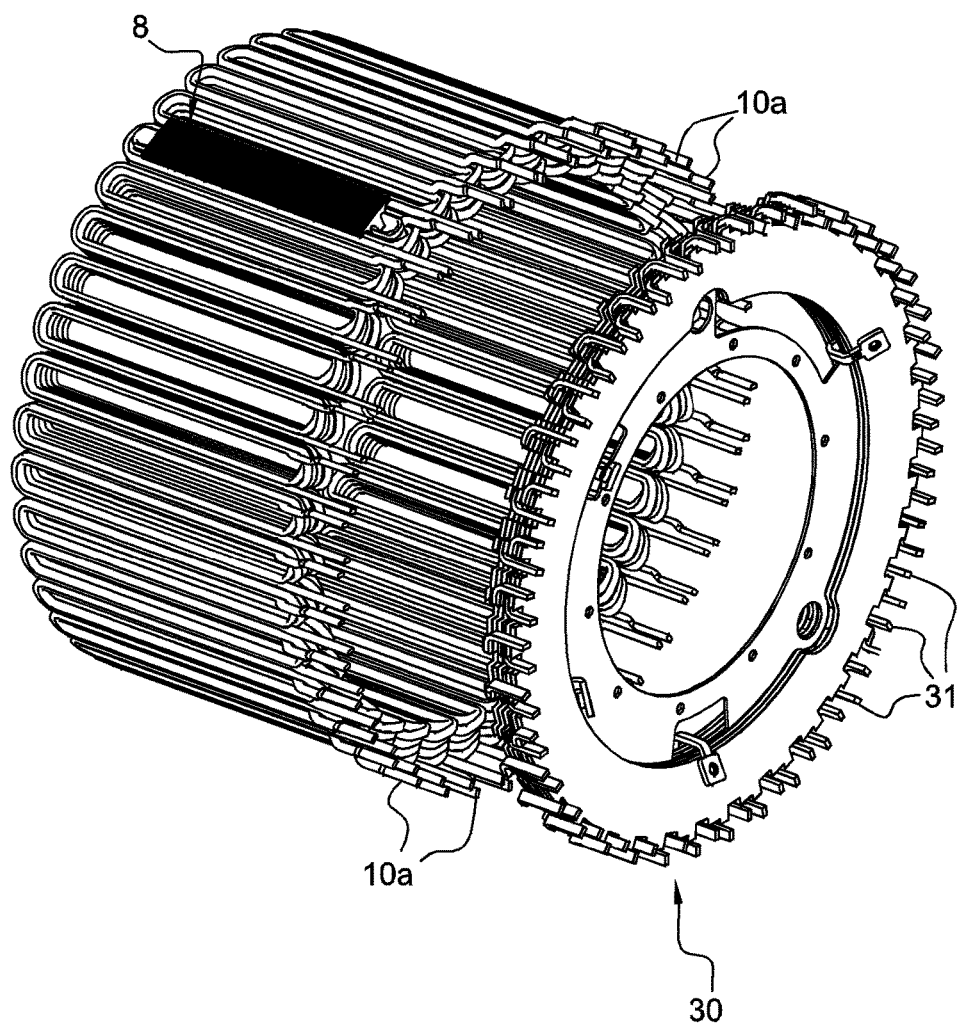

Other features and advantages of the invention will also be apparent from the drawings given by way of illustrative and non-limiting examples wherein:

FIG. 1 shows in cross-section an embodiment of a wheel-motor incorporating a stator according to the invention, FIG. 2 is an exploded and perspective view of an embodiment of a portion of a stator, called a stator yoke, according to the invention, FIG. 3 is a cross-sectional perspective view of the portion of the stator of FIG. 2, FIG. 4 is an exploded and perspective view of another embodiment of part of a stator according to the invention, FIG. 5 is a partially exploded and perspective view of an embodiment of a stator tooth according to the invention, FIG. 6 is a partial perspective view of stator teeth according to the invention, mounted onto a stator yoke, FIG. 7 is a transversal schematic view and in cross-section along the line VII-VII of FIG. 5, of a stator tooth according to the invention, provided with an electrical winding, FIGS. 7a and 7b are transversal schematic views and in cross-section along the line VII-VII of FIG. 5, of other embodiments of the stator tooth according to the invention, provided with an electrical winding, FIGS. 8 and 8a schematically show the arrangement between the stator teeth and the stator yoke, of a stator according to the invention, illustrating the magnetic field lines, FIG. 9 is an exploded perspective view of a further embodiment of a stator tooth according to the invention, together with the winding and the insulation, FIG. 10 is a partial view, in cross-section along the plane X-X, of a longitudinal end of a stator tooth of FIG. 1, and FIG. 11 shows the relative arrangement of the stator teeth on a stator according to the invention and electrical connection means relating thereto.

DETAILED DESCRIPTION OF THE FIGURES

FIG. 1 represents in cross-section, an embodiment of an electrical machine according to the invention, constituting a wheel-motor incorporating a stator according to the invention and stator teeth according to the invention.

The electrical machine includes a rotor 1, mounted rotating on a fixed spindle 2, for example integral to a chassis. The rotary connection between the spindle 2 and the rotor 1 is provided by all known means, in particular by means of a system of bearings 3. The rotor 1 is provided on a inner face 4a with permanent magnets 5. Advantageously, in the case of a wheel-motor, the rotor 1 can constitute a rim with an outer face 4b intended for the fitting of a tire.

The electric machine also includes a stator 6 presenting a substantially cylindrical stator yoke 7 against which the stator teeth 8 are located and attached. The stator 6 is advantageously immobilized upon the fixed frame by means of immobilizing bolts that are not represented.

The stator teeth 8 are removable and equipped with a coil of wires 10, shown for example in cross-section in FIG. 1. The stator teeth 8 are mounted radially on the stator yoke 7 and attached to the latter by means of radial mounting bolts passing through said stator teeth 8 and engaged in a radial direction within said stator yoke 7.

FIG. 2 is an exploded and perspective view of an embodiment of a part of the stator 6 according to the invention and more specifically of the stator yoke 7. The latter includes a substantially cylindrical central portion 7a, wherein the thickness of the wall is sufficient for the machining of longitudinal channels 12, serving for the circulation of a cooling fluid. This central portion 7a therefore constitutes a radiator, transferring heat energy to cooling fluid circulating within the channels 12.

The stator yoke 7 also includes an inlet and outlet manifold 13 together with a return manifold 14, respectively attached to the axial edges of the central portion 7, for example by means of screwing. Axial holes 14a are for example machined into the return manifold 14 for purposes of mounting on the central portion 7a.

FIG. 3 is a cross-section and perspective view of the part of the stator 6 illustrated in FIG. 2.

The inlet and outlet manifold 13 advantageously includes an inlet opening 15 leading into an inlet peripheral groove 16 which is delimited by an inner face of the inlet and outlet manifold 13 and by a substantially transverse extension 17 extending from the wall of the central portion 7a toward the hub 2. Radial grooves 18 machined into the transversal extension 17 place the inlet peripheral groove 16 in contact with a selection 12a of channels 12.

The inlet and outlet manifold 13 also has an outlet opening leading to an outlet peripheral groove 20 which is delimited by a further inner face of the inlet and outlet manifold 13 and by a contact wall 21 intended to rest against the axial edge of the central portion 7a, whereupon lead the channels 12. The contact wall 21 is equipped with holes 22, opportunely distributed, such as to place a selection 12b of channels 12 in fluid contact with the outlet peripheral grove 20. The axial edge of the end of the central portion 7a and the inlet and outlet manifold 13 thus have complementary shapes in order to form the inlet peripheral groove 16. The outlet peripheral groove 20 is machined into the inlet and outlet manifold 13.

The return manifold 14 has, within an area facing the axial edge of the central portion 7a whereupon lead the channels 12, a series of grooves 14b allowing each to place a channel 12a and two adjacent channels 12b in fluid contact. The channel 12a thus has a diameter that is double that of the adjacent channels 12b. Referring for example to FIG. 3, it is clear that cooling fluid thus crosses the central portion 7a according to a direction A passing through a channel 12a, then crosses the central portion 7a again, in the opposite direction R by taking two channels 12b adjacent to channel 12a and located on either side of said channel 12a.

The cooling circuit is of course associated with a fluid reservoir and a pump and operate in a known manner.

The central portion 7a and the return manifold 14 advantageously have tapped radial holes 23, intended for the engagement of radial mounting bolts.

In a further embodiment shown in FIG. 4, the stator yoke 7 includes an internal cylindrical portion 7b and a coaxial external cylindrical portion 7c, extending around said internal cylindrical portion 7b delimiting, between said cylindrical portions, a helical cooling circuit, thus constituting a radiator. The helical cooling circuit is advantageously formed on the inner face of the external cylindrical portion 7c in the form of a helical groove 7d. The stator yoke 7, also includes the cooling fluid inlet and outlet manifold 13a mounted in an axial direction on one end of the cylindrical portions 7b, 7c. The helical cooling circuit, specifically the helical groove 7d, is advantageously manufactured such as to constitute a double-pass helix, thereby also providing the return path for the cooling fluid. The inlet and outlet manifold 13a is connected to the cooling circuit and provides the inlet and outlet of the cooling fluid within the helical portion of the cooling circuit. The cooling fluid therefore circulates in one direction by taking the first pass of the double-pass helix and returns in the opposite direction by taking the second pass of the double helix.

FIG. 5 is a partially exploded and perspective view of a stator tooth 8 according to the invention arranged facing the stator yoke 7. The stator tooth 8 is represented without an electrical coil. The stator tooth 8 includes a central part 24 formed with a contiguous assembly of precut magnetic metal sheets 24a and secured together for example by means of welding, gluing, plastic injection, or stapling.

The central part 24 is enclosed between two longitudinal end portions 25. The latter are secured to the central part 24 by means of welding and have a passage or hole for the engagement of radial mounting bolts which attach the stator tooth 8 to the stator yoke 7 in a radial direction.

The longitudinal end portions 25 have a rounded outer shape 25a in order to constitute a continuous support and contact surface for the electrical wire 10 wound onto the stator tooth 8. The electrical wire windings 10 on the stator tooth 8, and in particular the windings constituting the first layer, which is in contact with the central portion 24 via an electrical insulator, remain in contact with the rounded outer shapes 25a at the ends of the stator tooth 8. This significantly enhances heat exchange with the stator yoke 7. Such an innovative construction improves the performance of an electrical machine in so far as such performance relates to temperature. A decrease in operating temperature increases the performance of the electrical machine together with lifetime thereof. Indeed, the lower the operating temperature, the less the insulating materials are stressed.

FIG. 6 is a partial perspective view of stator teeth 8 according to the invention and mounted on a stator yoke 7. Not all of the stator teeth 8 are represented and for reasons of simplification of the presentation, the electrical wires 10 are not shown.

FIG. 7 is a transversal and cross-sectional view along the line VII-VII of a stator tooth 8 of FIG. 5, provided with an electrical winding 10. Only a portion of the windings of the electrical wire 10 is shown. The electrical wire 10 advantageously has a rectangular cross section.

The precut magnetic metal sheets 24a advantageously have a flared upper end 24b and a flared lower end 24c between which extend the windings of the electrical wire 10. The upper ends 24b and lower ends 24c advantageously have a notch 26 for receiving a weld. The longitudinal end portions 25, preferably, have, on the side thereof intended to enclose the central portion 24, a shape identical to that of the precut magnetic metal sheets 24a, thereby facilitating the assembly of the stator tooth 8.

In the embodiments illustrated in FIGS. 7a and 7b, the lower ends 24c are not flared but straight. The stator tooth 8 does not therefore have a foot. This shape is advantageous insofar as it allows the winding of the coil 10 to be performed on a jig, and then to longitudinally engage said coil 10 on the central portion 24 and this at the lower end 24c.

In the embodiment of FIG. 7b, the upper end 24b, for example a metal sheet assembly, is brought and fixed by any known means, onto the upper end 24d of the central portion 24. The upper end 24b, in the form of a hat, is for example secured to the central part by means of a strap which is not shown.

The electrical wires 10 wound onto the stator teeth 8 have connection ends extending in the axial direction of the stator 6 and are interconnected according to a given phase connection scheme, by means of an annular connection disk. The latter, known as such, is axially mounted onto the connection ends of the electrical wires 10.

FIGS. 8 and 8a schematically illustrate the arrangement between the removable stator teeth 8 and the stator yoke 7 of a stator 6 according to the invention. These figures also schematically illustrate the magnetic field lines B passing through the thickness of the wall of the stator yoke 7. The heat exchange between the stator tooth 8 and the stator yoke 7 is improved for example by placing grease between these two elements prior to assembly.

In the embodiment illustrated in FIG. 9, the precut magnetic metal sheets 24a and the longitudinal end portions 25 are secured by means of banding tape 27, also called Polyglass Banding Tape (registered trade name). An electrical insulating structure 28 is then mounted on the stator tooth 8, thereby covering the precut magnetic metal sheets 24a and the banding tape 27 before the winding of the electrical wire 10. The electrical insulating structure 28 has on the longitudinal sides thereof a longitudinal channel 29, that is closed once the electrical wire 10 is wound onto the electrical insulating structure 28. The mounting and radial clamping bolts 11, intended to pass through the longitudinal end portions 25 are also illustrated in FIG. 9. Advantageously, the ends 10a of the electrical wire 10 protrude from the channels 29 in a longitudinal direction.

FIG. 10 is a partial view, in cross-section along the XX plane, of a longitudinal end of a stator tooth 8 of FIG. 1. This section also corresponds to an identical section of the stator tooth 8 of FIG. 9, once assembled.

FIG. 11 schematically illustrates the arrangement and the relative positioning of the stator teeth 8 in the absence of the stator yoke 7. The longitudinal and axial extension of the ends 10a of the electrical wires 10 allows for the use and mounting in an axial direction of a connection disk 30. The latter, known as such, allows for the simple and reliable interconnection of the various phases of the stator according to the invention. The connection disc 30 advantageously has connection pads 31 whereupon are welded the ends 10a of the electrical wires 10.

According to a further embodiment of the stator according to the invention, the longitudinal ends 10a of the electrical wires 10 are simply bent and/or folded before being brazed together in order to implement the interconnections of the various phases. Alternatively, the insertion of an intermediate piece between two longitudinal ends 10a, is also envisaged. The latter is then brazed to the longitudinal ends 10a. These latter two embodiments allow to be dispensed with the use of a connection disc 30.

For example, a synchronous electrical machine with permanent magnets 5 according to the invention, for example with sinusoidal electromotive force, advantageously constitutes a wheel-motor. The latter can equip a road or railway vehicle. The innovative design of the wheel-motor according to the invention thus allows the bulk thereof to be reduced and space within said wheel to be released. Said space can then be utilized to accommodate a traction inverter.

The electrical machine according to the invention can also be used as an elevator or winch motor.

It is obvious that this description is not limited to the examples explicitly described, but also includes other embodiments and/or implementations. Thus, a described technical feature can be replaced by an equivalent technical feature, without departing from the scope of the present invention.

The invention claimed is:

1. A removable stator tooth for an electrical machine and intended to hold a winding of an electrical wire, said stator tooth comprising a central portion formed with a contiguous assembly of precut magnetic metal sheets, said precut magnetic metal sheets being secured to one another, characterized in that the central portion is enclosed between two longitudinal end portions which are secured to the central portion and each have a radial attachment bolt passing therethrough, said longitudinal end portions having a rounded outer shape for forming, on the ends of the stator tooth, a continuous contact surface for the electrical wire(s) wound onto said stator tooth.

2. The stator tooth according to claim 1, characterized in that the electrical wire (s) have a rectangular cross section.

3. The stator tooth according to claim 1, characterized in that the longitudinal end portions are metallic.

4. The stator for an electrical machine comprising a cylindrical stator yoke made from magnetic material, upon which stator teeth, according to claim 1, are radially and directly attached.

5. The stator according to claim 4, characterized in that the stator yoke incorporates a cooling circuit.

6. The stator according to claim 5, characterized in that the stator yoke comprises a central portion constituting a radiator, a cooling fluid inlet and outlet manifold mounted in an axial direction on one end of the central portion and a return manifold for the cooling fluid mounted in an axial direction on the other end of the central portion, the inlet and outlet manifold being connected to the cooling circuit.

7. The stator according to claim 5, characterized in that the stator yoke comprises an inner cylindrical portion and an outer cylindrical portion extending around said inner cylindrical portion defining between said cylindrical portions a helical cooling system in the form of a double-pass helix constituting a radiator, the stator yoke further comprising a cooling fluid inlet and outlet manifold mounted in an axial direction on one end of the cylindrical portions and in fluid communication with the double-pass helix, the inlet and outlet manifold being connected to the cooling circuit thus providing for the inlet and outlet of cooling fluid.

8. The stator according to claim 4, characterized in that the electrical wires wound onto the stator teeth have connection ends extending in the axial direction of said stator and that are connected according to a given phase connection scheme, by means of a connecting disk axially mounted on said connection ends.

9. The stator according to claim 4, characterized in that the electrical wires wound onto the stator teeth have connection ends extending in the axial direction of said stator and that are bent and/or folded in order to be interconnected by means of brazing, according to a given phase connection scheme.

10. The stator according to claim 4, characterized in that the electrical wires wound onto the stator teeth have connection ends extending in the axial direction of said stator and are connected according to a given phase connection scheme, by means of a brought piece brazed to the connection ends.

11. An electrical machine comprising a rotor extending around a stator according to any one of claim 4.

12. A wheel-motor characterized in that the wheel-motor comprises an electrical machine according to claim 11, the rotor comprises a hub mounted free in rotation by means of bearings on a fixed spindle, said rotor forming a rim having an outer face whereupon a tire is mounted and an inner face whereupon the permanent magnets are attached, the stator being intended to be secured to a fixed frame.

13. The electrical machine according to claim 11, characterized in that the rotor comprises a magnetic metal sheet whereupon permanent magnets are directly attached.

14. The electrical machine according to claim 13, characterized in that the permanent magnets are attached to the magnetic metal sheet by bonding or by any other mechanical retaining means.

* * * * *